US009409251B2

(12) United States Patent  
Vosters et al.

(10) Patent No.: US 9,409,251 B2  
(45) Date of Patent: Aug. 9, 2016

(54) RADIATION BEAM WELDING METHOD, BODY AND LITHOGRAPHIC APPARATUS

(75) Inventors: Petrus Mathijs Henricus Vosters, Bladel (NL); Mark Scholten, Einighausen (NL); Ilya Malakhovskiy, Eindhoven (NL); Martinus Josephus Theodorus Maria Cortenbach, Aarle-Rixtel (NL)

(73) Assignee: ASML Netherlands B.V., Veldhoven (NL)

( * ) Notice: Subject to any disclaimer, the term of this patent is extended or adjusted under 35 U.S.C. 154(b) by 775 days.

(21) Appl. No.: 13/610,689

(22) Filed: Sep. 11, 2012

(65) Prior Publication Data

US 2013/0094897 A1    Apr. 18, 2013

Related U.S. Application Data

(60) Provisional application No. 61/546,172, filed on Oct. 12, 2011.

(51) Int. Cl.
*B23K 26/00*    (2014.01)
*B23K 15/00*    (2006.01)

(52) U.S. Cl.
CPC ......... *B23K 15/0006* (2013.01); *B23K 15/0046* (2013.01); *B23K 26/244* (2015.10); *B23K 2201/36* (2013.01); *Y10T 403/477* (2015.01)

(58) Field of Classification Search
CPC .......... B23K 15/0006; B23K 15/0046; B23K 2201/36; B23K 26/246
USPC ............. 219/121.13, 121.14, 121.63, 121.83; 356/496, 511
See application file for complete search history.

(56) References Cited

U.S. PATENT DOCUMENTS

| 5,483,034 A | 1/1996 | Havard et al. |
| 6,998,570 B1 * | 2/2006 | Watkins et al. .......... 219/121.63 |

(Continued)

FOREIGN PATENT DOCUMENTS

| DE | 10 2008 015 995 A1 | 10/2009 |
| JP | 2000-310470 A | 11/2000 |

(Continued)

OTHER PUBLICATIONS

English-Language Abstract for German Patent Publication No. 10 2008 015 995 A1, published Oct. 1, 2009; 1 page.

(Continued)

*Primary Examiner* — Thien S Tran
(74) *Attorney, Agent, or Firm* — Sterne, Kessler, Goldstein & Fox P.L.L.C.

(57) ABSTRACT

A method for radiation beam welding of a first member to a second member of a cooling body for an electromagnetic actuator. The first member on a side thereof comprises a surface portion provided with a recess, which is delimited by a periphery, and wherein the second member comprises a substantially continuous first surface portion complementary to the surface portion of the first member in order to close off the recess, the second member being provided with a second surface portion opposite to the first surface portion. The method comprising arranging the first and second member such that the first surface portion engages with the surface portion of the first member; providing a radiation beam, directing the radiation beam towards the second surface portion such that the first and second member are welded together at the periphery of the recess.

16 Claims, 4 Drawing Sheets

(56) References Cited

U.S. PATENT DOCUMENTS

| | | | |
|---|---|---|---|
| 2003/0183606 A1* | 10/2003 | Lundgren | 219/121.63 |
| 2004/0139721 A1* | 7/2004 | Haggander | F02K 9/48 60/39.15 |
| 2005/0246894 A1 | 11/2005 | Lundgren | |
| 2006/0065639 A1 | 3/2006 | Musselman | |
| 2006/0096957 A1 | 5/2006 | Pfiz | |
| 2008/0035306 A1 | 2/2008 | White et al. | |
| 2010/0220444 A1 | 9/2010 | Voigtlaender et al. | |

FOREIGN PATENT DOCUMENTS

| | | |
|---|---|---|
| JP | 2002-003915 A | 1/2002 |
| JP | 2002-257490 A | 9/2002 |
| JP | 2005-279777 A | 10/2005 |
| JP | 2006-095602 A | 4/2006 |
| JP | 2006-130565 A | 5/2006 |
| JP | 2008-126298 A | 6/2008 |
| JP | 2009-115448 A | 5/2009 |
| JP | 2010-500760 A | 1/2010 |
| JP | 2010-096022 A | 4/2010 |
| JP | 2011-514002 A | 4/2011 |

OTHER PUBLICATIONS

English-Language Abstract for Japanese Patent Publication No. 2000-310470 A, published Nov. 7, 2000; 1 page.

English-Language Abstract for Japanese Patent Publication No. 2002-003915 A, published Jan. 9, 2002; 1 page.

English-Language Abstract for Japanese Patent Publication No. 2002-257490 A, published Sep. 11, 2002; 1 page.

English-Language Abstract for Japanese Patent Publication No. 2008-126298 A, published Jun. 5, 2008; 1 page.

English-Language Abstract for Japanese Patent Publication No. 2009-115448 A, published May 28, 2009; 1 page.

English-Language Abstract for Japanese Patent Publication No. 2010-096022 A, published Apr. 30, 2010; 1 page.

* cited by examiner

RADIATION BEAM WELDING METHOD, BODY AND LITHOGRAPHIC APPARATUS

CROSS REFERENCE TO RELATED APPLICATIONS

This application claims the benefit under 35 U.S.C. §119(e) to U.S. Provisional Patent Application No. 61/546,172, filed Oct. 12, 2011, which is incorporated by reference herein in its entirety.

BACKGROUND

1. Field of the Invention

The present invention relates to a method for radiation beam welding a first member to a second member of an electromagnetic actuator, a body made using the method and a lithographic apparatus comprising such a body.

2. Description of the Related Art

A lithographic apparatus is a machine that applies a desired pattern onto a substrate, usually onto a target portion of the substrate. A lithographic apparatus can be used, for example, in the manufacture of integrated circuits (ICs). In such a case, a patterning device, which is alternatively referred to as a mask or a reticle, may be used to generate a circuit pattern be formed on an individual layer of the IC. This pattern can be transferred onto a target portion (e.g., including part of, one, or several dies) on a substrate (e.g., a silicon wafer). Transfer of the pattern is typically via imaging onto a layer of radiation-sensitive material (resist) provided on the substrate. In general, a single substrate will contain a network of adjacent target portions that are successively patterned. Conventional lithographic apparatus include so-called steppers, in which each target portion is irradiated by exposing an entire pattern onto the target portion at once, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

Scanning of the wafer and/or reticle is usually performed by a stage system, for instance a stage system including two stages put on top of each other, wherein one stage is used for coarse positioning and the other stage is used for fine positioning. Current stage system designs use electromagnetic actuators in which an electric current carrier interacts with a magnetic field generated by permanent magnets. A disadvantage of these actuators is that the electric current running through the electric current carrier dissipates a lot of energy thereby increasing the temperature. The temperature increase has an influence on the surrounding parts thereby reducing the accuracy of the apparatus. Further, the maximum allowable temperature of the electric current carrier limits the allowable electric current and thus the force that can be applied by the actuator.

In order to keep the temperature of the actuators within predetermined limits, the actuators may be cooled using cooling bodies with cooling channels around the electric current carrier thereby removing the dissipated heat and acting as a thermal shielding towards other parts. The cooling bodies are formed by connecting two plates to each other, wherein in one of the two plates recesses or cavities are formed as channels, and the other plate is used to close off the channels. The two plates may be connected to each other by laser beam welding.

However, when using laser beam welding to connect the two plates together, the maximum load a welding seam can withstand is limited due to oscillating loads as a result of the actuators driving cycle and as a result of pressure loads in the cooling channels when pumping around cooling liquid.

SUMMARY

It is desirable to provide an improved actuator for a lithographic apparatus with a cooling system that is able to withstand higher loads.

According to an embodiment of the present invention, there is provided a method for radiation beam welding of a first member to a second member of an electromagnetic actuator. The first member on a side thereof comprises a surface portion provided with a recess, which recess is delimited by a periphery. The second member comprises a substantially continuous first surface portion complementary to the surface portion of the first member in order to close off the recess in the first member, thereby forming a cavity in a body formed by the first and second member. The second member is provided with a second surface portion opposite to the first surface portion. The method comprises arranging the first and second member with respect to each other such that the first surface portion of the second member engages with the surface portion of the first member in order to close off the recess; providing a radiation beam for radiation beam welding; directing the radiation beam towards the second surface portion such that the first and second member are welded together at the periphery of the recess to form a weld having a recess side facing towards the recess, wherein a continuous transition is formed between the first and second member on the recess side of the weld.

According to a further embodiment of the present invention, there is provided a body manufactured according to a radiation beam welding method according to an embodiment of the invention.

According to another embodiment of the invention, there is provided a body with a cavity. The body comprises a first member and a second member. The cavity is formed as a recess in the first member which is closed off by the second member. The first and second members are attached to each other by radiation beam welding at a periphery of the recess in the first member, thereby forming a weld having a recess side facing towards the recess, such that a continuous transition is formed between the first and second member on the recess side of the weld.

According to yet another embodiment of the invention, there is provided a lithographic apparatus comprising a body according to an embodiment of the invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

Figure 1:
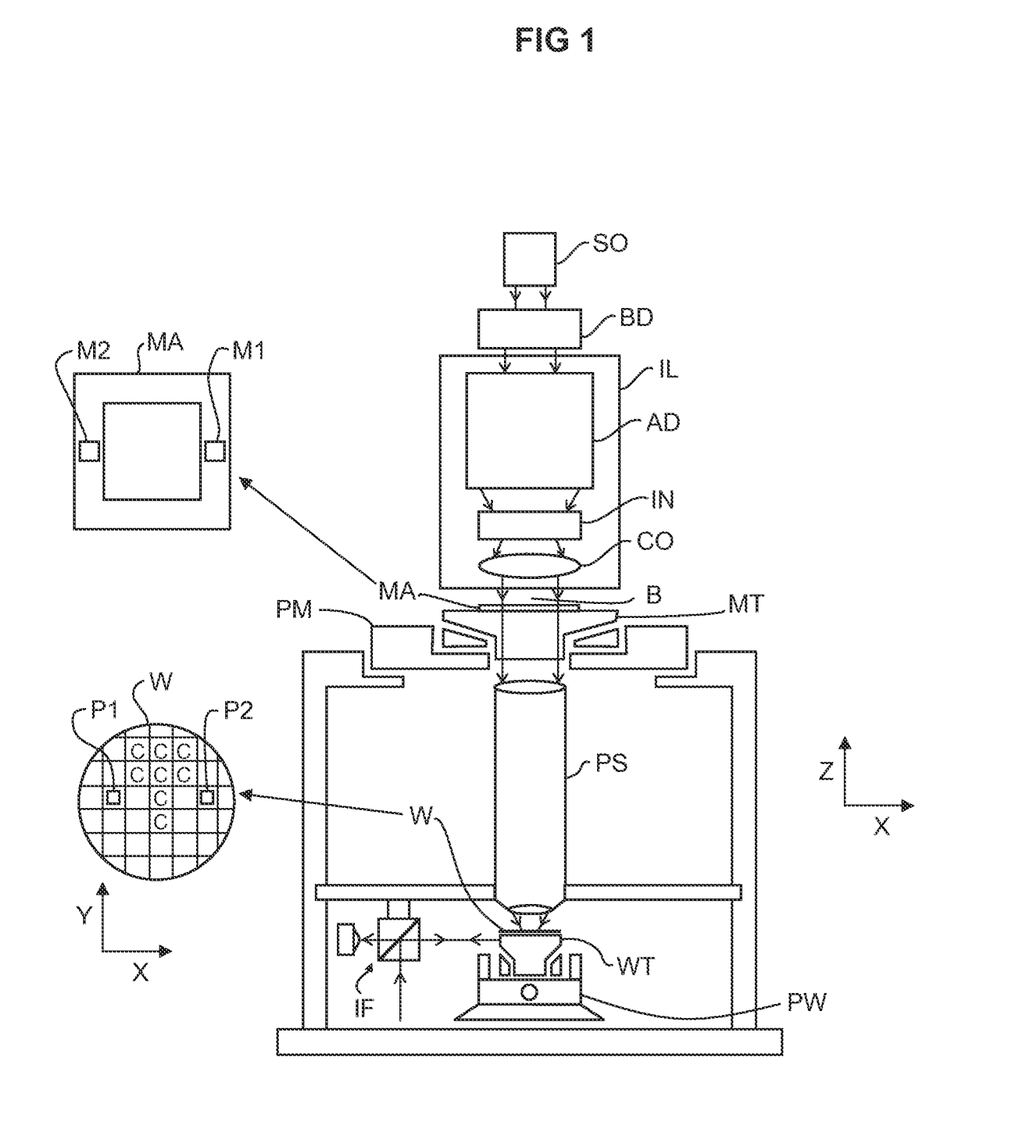
FIG. 1 depicts a lithographic apparatus according to an embodiment of the invention.

FIG. 1 schematically depicts a lithographic apparatus according to one embodiment of the invention. The apparatus includes an illumination system (illuminator) IL configured to condition a radiation beam B (e.g., UV radiation or any other suitable radiation), a mask support structure (e.g., a mask table) MT constructed to support a patterning device (e.g., a mask) MA and connected to a first positioning device PM configured to accurately position the patterning device in accordance with certain parameters. The apparatus also includes a substrate table (e.g., a wafer table) WT or "substrate support" constructed to hold a substrate (e.g., a resist-coated wafer) W and connected to a second positioning device PW configured to accurately position the substrate in accordance with certain parameters. The apparatus further includes a projection system (e.g., a refractive projection lens system) PS configured to project a pattern imparted to the radiation beam B by patterning device MA onto a target portion C (e.g., including one or more dies) of the substrate W.

The illumination system may include various types of optical components, such as refractive, reflective, magnetic, electromagnetic, electrostatic or other types of optical components, or any combination thereof, for directing, shaping, or controlling radiation.

The mask support structure supports, i.e., bears the weight of, the patterning device. It holds the patterning device in a manner that depends on the orientation of the patterning device, the design of the lithographic apparatus, and other conditions, such as for example whether or not the patterning device is held in a vacuum environment. The mask support structure can use mechanical, vacuum, electrostatic or other clamping techniques to hold the patterning device. The mask support structure may be a frame or a table, for example, which may be fixed or movable as required. The mask support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section so as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g., employing a transmissive mask). Alternatively, the apparatus may be of a reflective type (e.g., employing a programmable mirror array of a type as referred to above, or employing a reflective mask).

The lithographic apparatus may be of a type having two (dual stage) or more substrate tables or "substrate supports" (and/or two or more mask tables or "mask supports"). In such "multiple stage" machines the additional tables or supports may be used in parallel, or preparatory steps may be carried out on one or more tables or supports while one or more other tables or supports are being used for exposure.

The lithographic apparatus may also be of a type wherein at least a portion of the substrate may be covered by a liquid having a relatively high refractive index, e.g., water, so as to fill a space between the projection system and the substrate. An immersion liquid may also be applied to other spaces in the lithographic apparatus, for example, between the mask and the projection system. Immersion techniques can be used to increase the numerical aperture of projection systems. The term "immersion" as used herein does not mean that a structure, such as a substrate, must be submerged in liquid, but rather only means that a liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD configured to adjust the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross-section.

The radiation beam B is incident on the patterning device (e.g., mask MA), which is held on the mask support structure (e.g., mask table MT), and is patterned by the patterning device. Having traversed the mask MA, the radiation beam B passes through the projection system PS, which focuses the beam onto a target portion C of the substrate W. With the aid of the second positioning device PW and position sensor IF (e.g., an interferometric device, linear encoder or capacitive sensor), the substrate table WT can be moved accurately, e.g., so as to position different target portions C in the path of the radiation beam B. Similarly, the first positioning device PM and another position sensor (which is not explicitly depicted in FIG. 1) can be used to accurately position the mask MA with respect to the path of the radiation beam B, e.g., after mechanical retrieval from a mask library, or during a scan. In general, movement of the mask table MT may be realized with the aid of a long-stroke module (coarse positioning) and a short-stroke module (fine positioning), which form part of the first positioning device PM. Similarly, movement of the substrate table WT or "substrate support" may be realized using a long-stroke module and a short-stroke module, which form part of the second positioner PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:

1. In step mode, the mask table MT or "mask support" and the substrate table WT or "substrate support" are kept essentially stationary, while an entire pattern imparted to the radiation beam is projected onto a target portion C at one time (i.e., a single static exposure). The substrate table WT or "substrate support" is then shifted in the X and/or Y direction so that a different target portion C can be exposed. In step mode, the maximum size of the exposure field limits the size of the target portion C imaged in a single static exposure.

2. In scan mode, the mask table MT or "mask support" and the substrate table WT or "substrate support" are scanned synchronously while a pattern imparted to the radiation beam is projected onto a target portion C (i.e., a single dynamic exposure). The velocity and direction of the substrate table WT or "substrate support" relative to the mask table MT or "mask support" may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT or "mask support" is kept essentially stationary holding a programmable patterning device, and the substrate table WT or "substrate support" is moved or scanned while a pattern imparted to the radiation beam is projected onto a target portion C. In this mode, generally a pulsed radiation source is employed and the programmable patterning device is updated as required after each movement of the substrate table WT or "substrate support" or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

The first and second positioning device PM,PW may comprise electromagnetic actuators in which an electric current carrier interacts with a magnetic field of a permanent magnet in order to generate actuator forces. However, the electric current running through the electric current carrier will generate heat in the electric current carrier with an increase in temperature as a result.

In order to keep the temperature of the actuator below a predetermined maximum temperature, the lithographic apparatus comprises a cooling body making contact with the electric current carrier to extract heat there from. The cooling body may also act as a thermal shielding element to prevent thermal radiation from reaching other parts of the lithographic apparatus, thereby improving the accuracy of the apparatus. A schematic example of such a cooling body is shown in FIG. 2.

Figure 2:
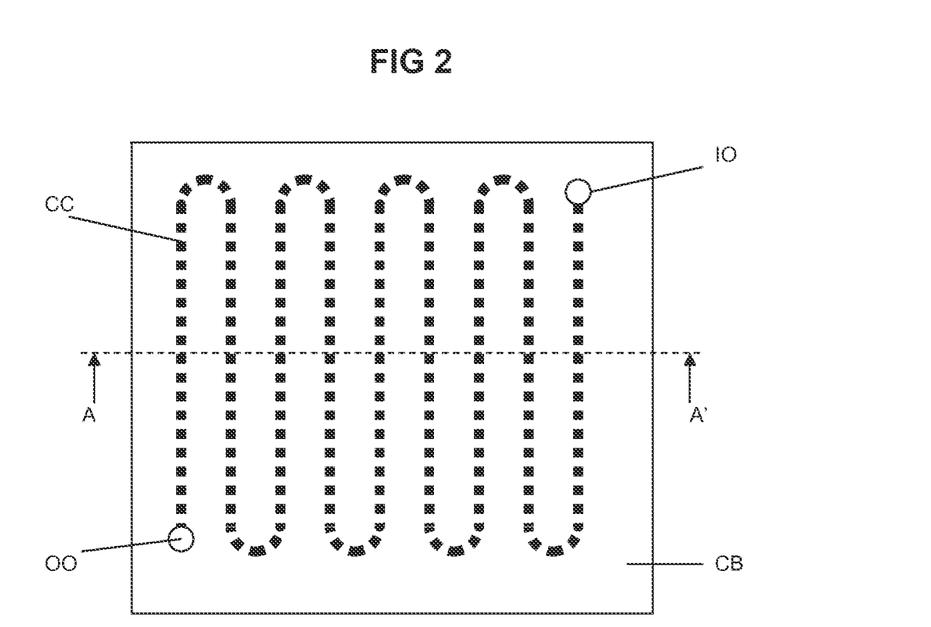
FIG. 2 depicts a body of the lithographic apparatus of FIG. 1.

FIG. 2 depicts a schematic top view of a cooling body CB. Inside the cooling body CB a cooling channel CC is provided that meanders through the body CB. Because normally the cooling channel CC is not visible, the cooling channel CC is depicted using a dashed line. The cooling channel CC has an inlet opening IO and an outlet opening OO provided in the exterior surface of the cooling body CB, so that cooling liquid, e.g., water, can be provided to the cooling channel CC to run through the cooling body CB.

Figure 3:
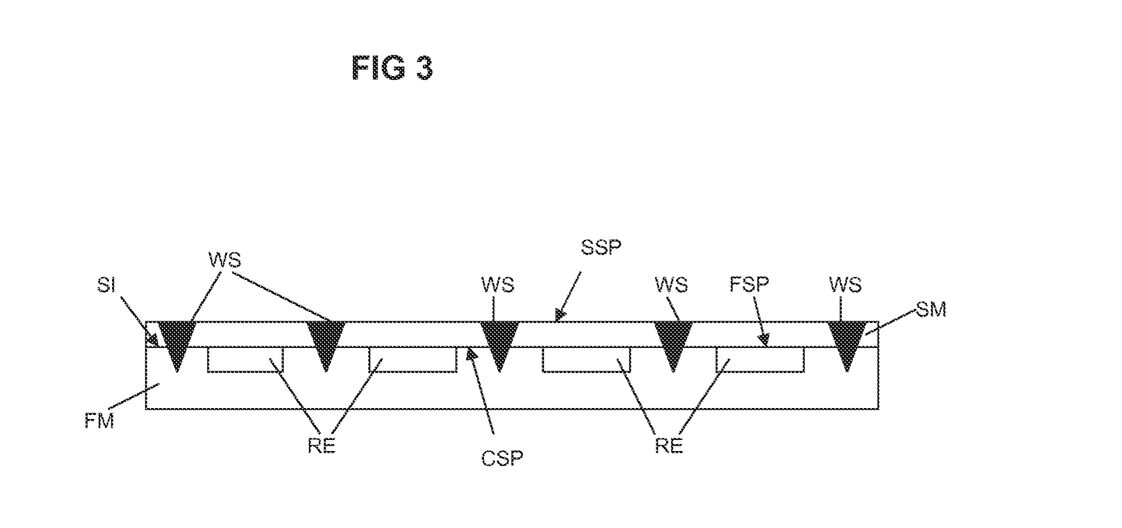
FIG. 3 depicts a prior art method of forming the body of FIG. 2.

FIG. 3 depicts a prior art embodiment of how a cooling body CB of FIG. 2 may be formed. FIG. 2 therefor shows a part of a cross section of the cooling body in accordance with the line A-A' as shown in FIG. 2. The cooling body can be formed by combining a first member FM and a second member SM. On a side SI of the first member FM, the first member comprises an outer surface portion CSP provided with a recess RE to form a cooling channel.

The second member SM comprises a continuous first surface portion FSP to engage with the outer surface portion CSP in order to close off the recess RE thereby forming the cooling channel. The first surface portion FSP is thus complementary to the outer surface portion CSP. Opposite to the first surface portion FSP, the second member comprises a second surface portion SSP.

The first and second member FM,SM are connected to each other using radiation beam welding by: arranging the first and second member with respect to each other such that the first surface portion FSP of the second member SM engages with the outer surface portion CSP of the first member FM in order to close off the recess; providing a radiation beam for radiation beam welding; directing the radiation beam towards the second surface portion SSP such that the first and second member are welded together.

The resulting welding seams WS are shown in FIG. 3. One of the welding seams WS is shown in more detail in FIG. 4. More clearly shown are the outer surface portion CSP of the first member FM including the recess RE, the second member with the first and second surface portions FSP,SSP, and the welding seam WS in between the first and second member FM,SM. The welding seam WS is provided somewhere in the middle of the outer surface portion CFP in between the two recess portions RE.

Figure 4:
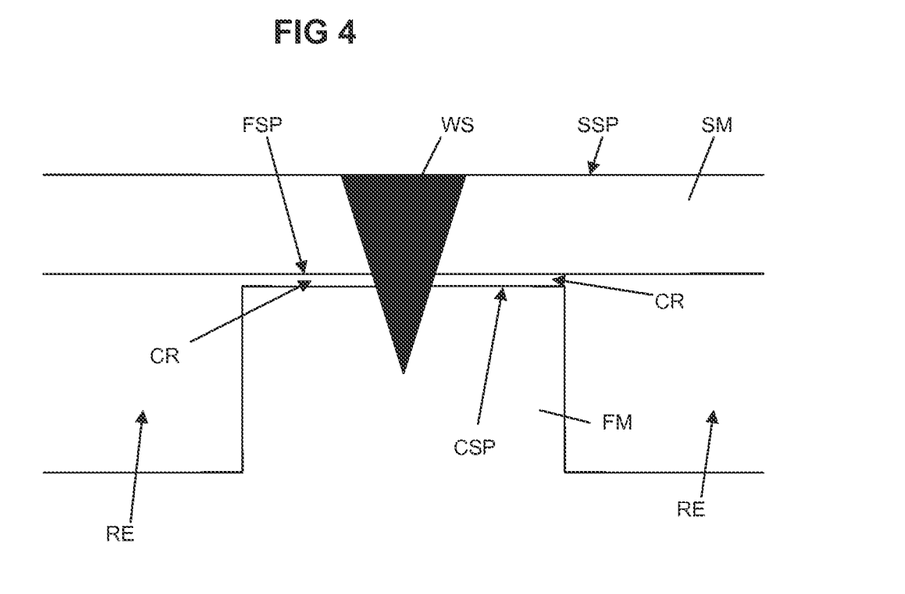
FIG. 4 depicts in more detail the prior art method of FIG. 3.

As a result of this prior art welding method, there still exists a crack CR on either side of the welding seam WS, so that no continuous transition is provided between the first and second member on the recess side of the welding seam. Due to the crack CR there is a sharp transition from first member to second member, i.e., a radius of curvature in the transition may get below the 10 micrometers. As a result thereof, the transition is subject to high local stresses, especially in case of oscillating loads due to an actuating driving cycle, but also due to pumping cooling liquid through the cooling channels.

Figure 5:
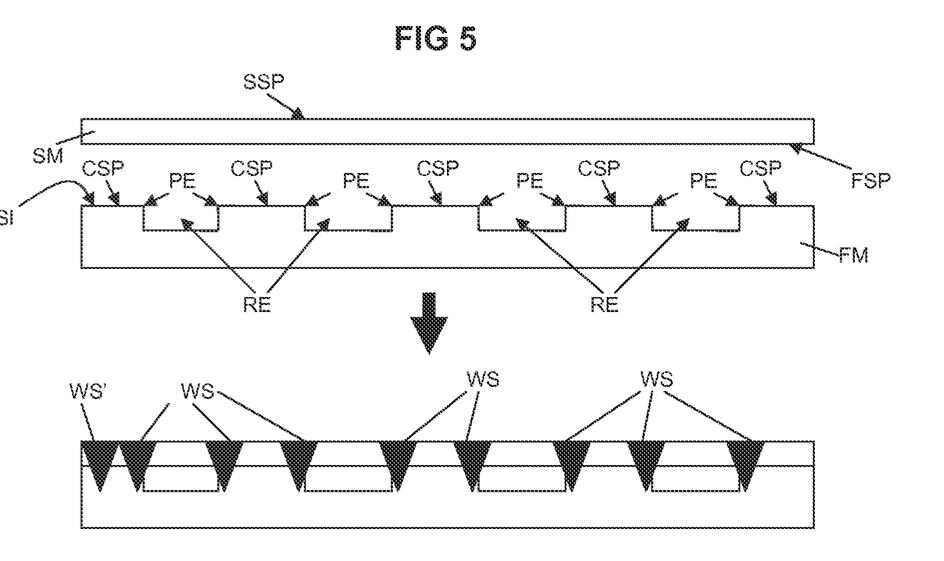
FIG. 5 depicts a radiation beam welding method for forming the body of FIG. 2 according to an embodiment of the invention.
Figure 6:
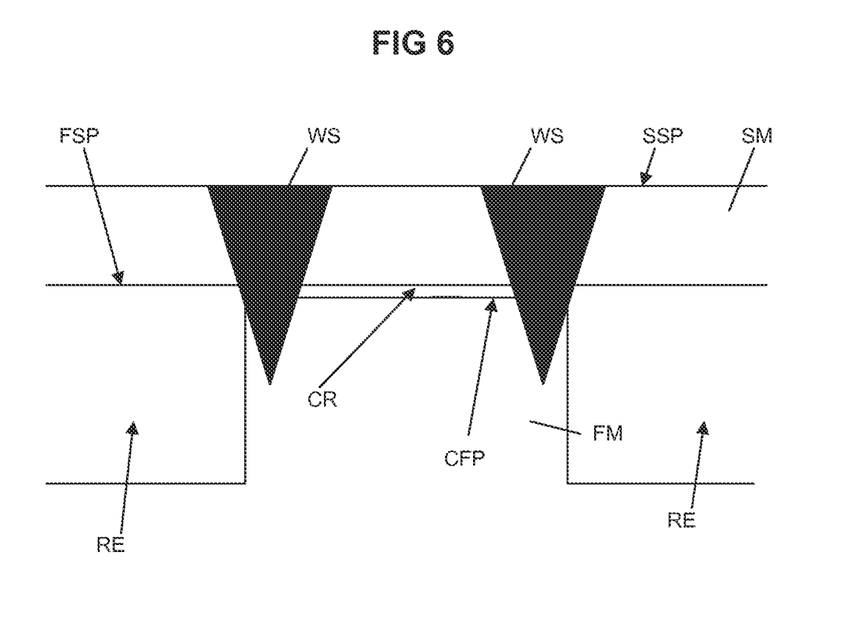
FIG. 6 depicts in more detail the result of the method of FIG. 5.

FIG. 5 depicts schematically a radiation beam welding method according to an embodiment of the invention in order to weld a first member FM to a second member SM. The welding method is shown in relation to the cross-section A-A' of the cooling body CB of FIG. 2. The provided thickness of the second member SM is at least 100 micrometers, preferably at least 200 micrometer, more preferably at least 500 micrometer and most preferably at least 1000 micrometer. Accordingly the second member SM is considered as a thin plated member. FIG. 6 depicts in more detail two welding seams WS in this cross-section. In an embodiment the width of the outer surface portion CSP is at least similar, for example 2 times, or for example 5 times and or for example 10 times larger than the thickness of the second member SM to form an effective heat buffer/transport during the welding process.

The method starts with providing a first and second member FM,SM as shown in the upper part of FIG. 5. On a side SI of the first member FM, an outer surface portion CSP is provided with a recess RE. The recess RE has a periphery PE delimiting the recess RE, i.e., the periphery PE is on the boundary from recess RE to surface portion CSP. The outer surface portion CSP is in this embodiment lying in a flat plane.

The second member SM has a continuous first surface portion FSP complementary to the surface portion CSP of the first member, thereby being able to close off the recess RE to form the cooling channel. In this embodiment, the first surface portion FSP is also lying in a flat plane similar to the flat plane of the outer surface portion CSP. Opposite to the first surface portion FSP, a second surface portion SSP is provided to receive a radiation beam for radiation beam welding. The first and second member are connected to each other by: arranging the first and second member FM,SM with respect to each other such that the first surface portion FSP of the second member SM engages with the surface portion CSP of the first member FM in order to close off the recess RE; providing a radiation beam for radiation beam welding; directing the radiation beam towards the second surface portion SSP such that the first and second member FM,SM are welded together at the periphery PE of the recess RE to form a weld having a recess side facing towards the recess, wherein a continuous transition is formed between the first and second member FM,SM on the recess side of the weld WS instead of a transition with small gaps or cracks.

The result is shown in more detail in FIG. 6. The advantage of this method is that the transition between the first and second member at the recess side of the welding seam is continuous and no crack is formed between the welding seam and the recess. Although there still may be a crack in between two welding seams as depicted in FIG. 6, the influence of this crack is minimal. A further advantage of applying two continuous welding seams is a reduced risk of fluid entering into the possible crack in between the two welding seams resulting in a reduced risk of crevice corrosion. Due to the absence of the crack on the recess side of the weld WS, the connection is able to withstand higher stresses. Experimental results have shown that the stresses a weld according to the invention can withstand may be up to three times higher than a prior art weld.

The weld may be made such that material from the first and second member has been relocated to form a rounded transition between the first and second member, wherein the provided radius of curvature is at least 10 micrometers, at least 25 micrometer, at least 50 micrometer and at least 100 micrometer. Even radii of curvatures in the order of 100-200 have been shown to be feasible.

The radiation beam used to make the weld may be a laser beam or an electron beam. The material of the first and second member is preferably titanium, a titanium alloy, stainless steel or aluminum. Alternatively, any other heat source may be used in order to weld the first and second member together as long as the position of the weld can be controlled accurately enough in order to provide the continuous transition. As a result, any material, e.g., metal, that can be welded together can be used in the first and second member.

Figure 7:
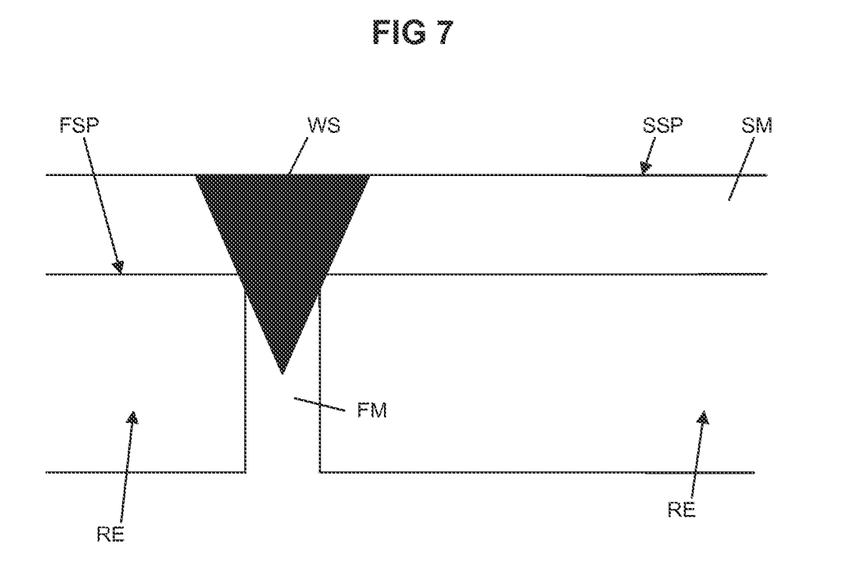
FIG. 7 depicts a welding seam to connect a first and second member to each other according to another embodiment of the invention.

FIG. 7 shows a connection between first and second member FM,SM according to another embodiment of the invention, wherein a single welding seam WS is used to connect a first member FM to a second member SM in such a way that both sides of the welding seam WS face towards a recess RE and a continuous transition between the first and second member is formed on both sides of the welding seam. In other words, a radiation beam for radiation beam welding is directed towards the second surface portion SSP of the second member that the first and second member are welded together at two periphery portions at the same time.

In an embodiment, the angle between a recess wall near the periphery and the first surface portion of the second member near the periphery may be 90 degrees. Alternatively, the angle may be acute or obtuse, i.e., smaller or larger than 90 degrees. The advantage of using an angle other than 90 degrees may be that the rounded transition formed by a radiation beam welding method according to the invention may have a larger radius of curvature than for the 90 degrees angle.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g., having a wavelength of or about 365, 248, 193, 157 or 126 nm) and extreme ultra-violet (EUV) radiation (e.g., having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g., semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for forming cooling channels for cooling an electromagnetic actuator, the method comprising:
   radiation beam welding first and second members together, wherein:
      the first member comprises recessed regions formed on a first surface of the first member and edges formed between the first surface and sidewalls of the recessed regions, and
      the second member comprises a second surface facing the first surface and a third surface opposite to the second surface; and
   using substantially flat surfaces extending in horizontal plane as the first and second surfaces,
   wherein:
      the radiation beam welding comprises:
         closing off the recessed regions with the second surface to form continuous cooling channels, and
         forming a plurality of welds along the edges of the first member;
      at least one pair of welds among the plurality of welds are displaced from each other by a portion of the first surface, the at least one pair of welds being adjacent to each other; and at least another pair of welds among the plurality of welds are displaced from each other by one of the recessed regions, the at least another pair of welds being adjacent to each other.

2. The method according to claim 1, further comprising using each weld of the plurality of welds to form a rounded transition between the first and second members.

3. The method according to claim 2, further comprising using at least about 10 micrometer, at least about 25 micrometer, at least about 50 micrometer, or at least about 100 micrometer as a radius of curvature of the rounded transition.

4. The method according to claim 1, further comprising using a laser beam as a radiation beam.

5. The method according to claim 1, wherein the radiation beam welding further comprises directing a radiation beam onto the third surface.

6. The method according to claim 1, further comprising using titanium, a titanium alloy, stainless steel, or aluminum for the first and second members.

7. The method according to claim 1, further comprising using metal plates as the first and second members.

8. The method according to claim 1, further comprising using a continuous recess-free surface as the second surface of the second member.

9. The method according to claim 1, further comprising using each weld of the plurality of welds to form a continuous transition between the first, second, and third surfaces.

10. A method comprising:
   radiation beam welding first and second metal plates together, wherein:
   the first metal plate comprises recessed regions formed on a first surface of the first metal plate and edges formed between the first surface and sidewalk of the recessed regions, and
   the second metal plate comprises a second surface facing the first surface and a third surface opposite to the second surface;
   forming continuous cooling channels in the first metal plate using the recessed regions; and
   using substantially flat surfaces extending in horizontal plane as the first and second surfaces,
   wherein:
   the radiation beam welding comprises forming a plurality of welds along the edges; and
   at least one pair of welds among the plurality of welds are displaced from each other by a portion of the first surface, the at least one pair of welds being adjacent to each other.

11. The method according to claim 10, further comprising using each weld of the plurality of welds to form a rounded transition between the first and second metal plates.

12. The method according to claim 10, further comprising using titanium, a titanium alloy, stainless steel, or aluminum for the first and second metal plates.

13. The method according to claim 10, further comprising using each weld of the plurality of welds to form a continuous transition between the first, second, and third surfaces.

14. The method according to claim 13, wherein the radiation beam welding further comprises directing a radiation beam on the third surface.

15. The method according to claim 10, wherein the radiation beam welding further comprises closing off the recessed regions with the second surface to form the continuous cooling channels.

16. The method according to claim 10, further comprising using a continuous recess-free surface as the second surface of the second metal plate.

* * * * *